United States Patent Office 3,390,139
Patented June 25, 1968

3,390,139
N-VINYL-2-PIPERAZINONES
Peter L. de Benneville, Philadelphia, Pa., assignor to Rohm & Haas Company, Philadelphia, Pa., a corporation of Delaware
No Drawing. Filed Mar. 4, 1964, Ser. No. 349,485
19 Claims. (Cl. 260—78.5)

ABSTRACT OF THE DISCLOSURE

This invention is directed to certain N-vinyl-2-piperazinones and to a method for preparing these novel compounds. The invention further relates to homopolymers of the N-vinyl-2-piperazinones and to copolymers of the novel piperazinones with other ethylenically unsaturated monomers. The copolymers of this invention are useful as thickening agents for starch-water mixtures, and are valuable as additives to lubricating oil and gasoline compositions. Furthermore the copolymers may be used in coating formulations and are also effective as aggregants for soils.

---

This case deals with specific N-vinyl-2-piperazinones as new compositions of matter. It further deals with a method for producing these specific N-vinyl-2-piperazinones. It also deals with polymers of the aforementioned specific N-vinyl-2-piperazinones.

The N-vinyl-2-piperazinones of the present invention may be represented by the formula

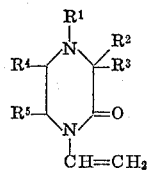

in which $R^1$ is hydrogen, alkyl, including cycloalkyl, of up to 18 carbon atoms, aralkyl or alkyl-substituted aralkyl of up to 18 carbon atoms, dialkylaminoalkyl of up to 12 carbon atoms wherein each of these alkyl groups contains up to 8 carbon atoms and furfuryl; $R^2$, individually, is hydrogen or methyl; $R^3$, individually, is hydrogen, alkyl, including cycloalkyl, of up to 18 carbon atoms, phenyl, naphthyl and alkyl-, chloro- and alkoxy-substituted phenyl or naphthyl in which the alkyl portion contains up to 18 carbons atoms, aralkyl and alkyl-substituted aralkyl of up to 18 carbon atoms and 2-furyl; $R^4$, individually, is hydrogen or alkyl of up to 4 carbon atoms and $R^5$, individually, is hydrogen or alkyl of up to 4 carbon atoms.

$R^1$ may typically represent hydrogen, methyl, ethyl, isopropyl, t-butyl, cyclopentyl, cyclohexyl, octyl, dodecyl, octadecyl, benzyl, phenylethyl, phenylbutyl, phenyloctyl, dimethylbenzyl, dibutylbenzyl, octylbenzyl, nonylbenzyl, dimethylaminoethyl, 2 - dimethylaminoisobutyl, diethylaminoethyl, dibutylaminoethyl, dipentylaminoethyl and furfuryl.

$R^2$ represents hydrogen or methyl.

$R^3$ typically represents hydrogen, methyl, ethyl, isopropyl, t-butyl, cyclopentyl, cyclohexyl, octyl, decyl, dodecyl, octadecyl, phenyl, naphthyl, chlorophenyl, dichlorophenyl, butylphenyl, dibutylphenyl, octylphenyl, nonylphenyl, methoxyphenyl, t-butoxyphenyl, octoxyphenyl, chloronaphthyl, butylnaphthyl, octylnaphthyl, methoxynaphthyl, ethoxynaphthyl, benzyl, phenylethyl, phenylbutyl, phenyloctyl, dimethylbenzyl, dibutylbenzyl, octylbenzyl, nonylbenzyl and 2-furyl.

In addition, $R^2$ and $R^3$, collectively, may typically represent, including the carbon atom to which they are attached, pentamethylene, hexamethylene or heptamethylene rings which may have alkyl substituents, such as methyl, ethyl, butyl, dimethyl or diethyl groups attached thereto. Here, the limitation to $R^2$ and $R^3$ is a total of 18 carbon atoms.

$R^4$ may typically represent hydrogen, methyl, ethyl, isopropyl and t-butyl.

$R^5$ may typically represent hydrogen, methyl, ethyl, isopropyl and t-butyl.

In addition, $R^4$ and $R^5$, collectively, including the carbon atoms to which they are attached, may typically represent pentamethylene, hexamethylene or heptamethylene rings which may have alkyl substituents, such as methyl, ethyl, butyl, dimethyl or diethyl groups attached thereto. Here, the limitation to $R^4$ and $R^5$ is a total of 18 carbon atoms.

The compounds of the present invention are prepared by reacting acetylene with a compound having the formula

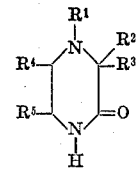

in which the symbols are as defined above.

The 2-piperazinones used as reactants in the present invention can be prepared by known reactions involving a suitable diamine and with (a) a cyanohydrin or (b) an α-halo-ester. The substituent, $R^1$, is frequently conveniently introduced by alkylation or by reductive alkylation of the corresponding compound in which $R^1$ represents hydrogen.

The reaction between acetylene and the 2-piperazinone may be conducted at atmospheric or superatmospheric pressures, such as up to about 2,000 pounds per square inch, and according to batch or continuous techniques. It may be conducted in the presence or absence of a solvent although generally a solvent is preferred, particularly if the vinylation is conducted at superatmospheric pressures. Suitable solvents are those that are inert and organic, such as dimethylformamide, N-methylpyrrolidinone, dimethyl sulfoxide, isopropanol, tetrahydrofuran, dioxane and the like. Temperatures in the range of about 100° to about 250° C. are employed, preferably 130° to 220° C.

The acetylene and 2-piperazinone are reacted in the presence of a strongly basic vinylation catalyst, such as the alkali metals, their hydroxides and alkoxides. Typical in this respect are sodium, potassium, sodium methoxide, sodium butoxide, sodium hydroxide, potassium ethoxide, potassium methoxide and potassium hydroxide. Preferred embodiments include sodium metal, potassium metal, sodium methoxide and potassium methoxide. The vinylation is preferably carried out by introducing acetylene, preferably in a solvent, to a selected 2-piperazinone in liquid or molten condition or more desirably also in a solvent, until the desired vinylation is consumated. At the conclusion of the reaction, the N-vinyl-2-piperazinones are isolated by distillation techniques, as will be more apparent hereinafter.

The N-vinyl-2-piperazinones described hereinabove can be homopolymerized or copolymerized with ethylenically unsaturated polymerizable monomers.

Suitable as comonomers are alkyl and aryl acrylates in which the alkyl or aryl portion contains preferably 1 to 18 carbon atoms; alkyl and aryl methacrylates in which the alkyl or aryl portion contains preferably 1 to 18 carbon atoms; acryonitrile; methacrylonitrile, alkylaminoalkyl and dialkylaminoalkyl acrylates and methacrylates; acrylamide and methacrylamide and their N-alkyl-substituted derivatives; styrene and alkyl ring-substituted styrenes containing no more than a total of about 20 carbon atoms; α-methylstyrene; divinylbenzene, and alkyl-substituted divinylbenzenes; trivinylbenzene and alkyl-substituted trivinylbenzenes; vinyl esters, in which the carboxylate portion contains 1 to 18 carbon atoms, including the carbon of the carboxylate functions; vinyl alkyl ethers and vinyl alkyl sulfides in which the alkyl portion contains no more than 18 carbon atoms and N-vinyl lactams, preferably containing from 6 to 20 carbon atoms; alkyl vinyl sulfones in which the alkyl portion contains up to about 18 carbon atoms; N-vinylalkyleneureas containing from 5 to 12 carbon atoms; olefins, such as isobutylene, butadiene and isoprene; dialkyl fumarates of up to 24 carbon atoms; dialkyl maleates of up to 24 carbon atoms; and dialkyl itaconates of up to 24 carbon atoms; and vinylpyridines.

In the above monomers, the alkyl groups may exhibit any possible spatial configuration, such as normal, iso, or tertiary. These alkyl groups may be acyclic or cyclic, including alkyl-substituted cyclic, as long as the total carbon content conforms to the defined amount. In the ring-substituted styrenes, the substituents may occupy any possible ring location or locations and when the substituents are alkyl groups, they may have any possible spatial configuration.

Typical of the above monomers that may be employed are methyl acrylate, isopropyl acrylate, cyclopentyl acrylate, 2-ethyl hexyl acrylate, decyl acrylate, dodecyl acrylate, octadecyl acrylate, methyl methacrylate, t-butyl methacrylate, cyclohexyl methacrylate, octyl methacrylate, undecyl methacrylate, dodecyl methacrylate, phenyl methacrylate, dimethylaminoethyl methacrylate, methoxyethoxyethyl methacrylate, t-butylaminoethyl methacrylate, t-dodecylaminoethyl acrylate, octadecyl methacrylate, acrylonitrile, methacrylonitrile, N,N-dibutyl acrylamide, acrylamide, N-methacrylamide, N-t-octylacrylamide, styrene, p-butylstyrene, p-octylstyrene, o-chlorostyrene, o,p-dipropylstyrene, p-cyanostyrene, o-methyl-p-decylstyrene, 1,4 - divinylbenzene, 1,3,5 - trivinylbenzene, ureidoethyl vinyl ether, butyl vinyl sulfide, octyl vinyl sulfide, octadecyl vinyl sulfide, hydroxyethyl vinyl sulfide, N-vinyl-2-pyrrolidinone, N-vinyl-5-methyl-2-pyrrolidinone, N-vinyl-4,4-dimethyl - 2 - pyrrolidinone, N-vinyl-4-butyl-5-octyl-2-pyrrolidinone, N-vinyl-6-methyl-2-piperidone, N-vinyl-6-octyl-2-piperidone, N - vinyl - 2 - oxohexamethylenimine, N-vinyl-5,5-dimethyl-2-oxohexamethylenimine, N-vinyl-4-butyl-5-octyl-2-oxohexamethylenimine, methyl vinyl sulfone, isobutyl vinyl sulfone, t-octyl vinyl sulfone, dodecyl vinyl sulfone, octadecyl vinyl sulfone, divinyl sulfone, N-vinylethyleneurea, N-vinyltrimethyleneurea, N-vinyl-1,2-propyleneurea, N-vinyl-butyleneurea, N-vinylcarbazole, vinyl acetate, vinyl stearate, dimethyl maleate, dioctyl maleate, dimethyl itaconate, dibutyl itaconate, dihexyl itaconate, dimethyl fumarate, diethyl fumarate, dioctyl fumarate, dibutyl fumarate, didodecyl fumarate, dibutyl maleate, dihexyl maleate, didecyl maleate, diethyl itaconate, dioctyl itaconate, didodecyl itaconate and 2-vinyl-5-methylpyridine.

It is understood that, in many cases, it will be preferred to combine more than one of the above comonomers with the specific N-vinyl-2-piperazinones of this invention, as for example, methyl methacrylate and styrene, in order to achieve various modifications of properties of the products contemplated.

Polymerization may be carried out in bulk when the monomers are liquids or low-melting solids, in solution, or in either suspension or emulsion. In bulk and solution polymerization, it is preferred to use one or more of the peroxide or azo initiators which act as free radical catalysts, and are effective between 30° and 150° C. These may be employed in amounts of 0.01 to 10% or more by weight, preferably 0.01 to 1% by weight. Typical initiators include benzoyl peroxide, t-butyl peroxide, acetyl peroxide, capryl peroxide, t-butyl hydroperoxide, cumene hydroperoxide, t-butyl perbenzoate, methylethyl ketone peroxide, azodiisobutyronitrile, azodiisobutyramide, dimethyl, diethyl, or dibutyl azodiisobutyrate, azobis(α,β-dimethylvaleronitrile), azobis(α-methylbutyronitrile), azobis(α-methylvaleronitrile), dimethyl or diethyl azobis-α-methylvalerate and the like.

In conjunction with a hydroperoxide, it is desirable, but not absolutely essential, to supply an activator. Its effect seems at least in part to provide free radicals at somewhat lower temperatures than are effective for free radical formation from hydroperoxides in the absence of such activator.

Especially effective as activators are quaternary ammonium compounds. Typical compounds of this sort are benzyltrimethylammonium chloride,
dibenzyldimethylammonium bromide,
butyldimethylbenzylammonium chloride,
octyltrimethylammonium chloride,
dodecyldimethylbenzylammonium chloride,
nonylbenzyltrimethylammonium chloride,
dodecylbenzyldimethylbenzylammonium chloride,
didodecenyldimethylammonium chloride,
benzyldimethyldodecenylammonium chloride,
octylphenoxyethyldimethylbenzylammonium chloride,
diisobutylphenoxyethoxyethyldimethylbenzylammonium chloride,
octylpyridinium chloride,
N-octyl-N-methylmorpholinium chloride, or bis-quaternary salts, such as those having quaternary nitrogens linked with an alkylene group, an ether group, or an amide-containing group.

The amount of activator is proportioned to the amount of hydroperoxide. Usually, the proportion of quaternary ammonium compound will be from 5% to 40% of the weight of the hydroperoxide.

Solution polymerization may be carried out in water, benzene, toluene, xylene, solvent naphthas, dioxane, diisobutyl ketone, acetonitrile, dimethyl formamide, ethanol, t-butyl alcohol and the like, depending on the solubilities of the monomers it is desired to use.

Emulsion polymerization is particularly effective with those members of the subject vinyl piperazinones which have low solubilities in water. There may be used in forming the emulsion, non-ionic or cationic emulsifiers, such as dodecyldimethylbenzylammonium chloride, dodecylbenzyltrimethylammonium chloride, cetylpyridinium chloride, alkylphenoxypolyethoxyethanols having alkyl groups of about 7 to 18 carbon atoms and 6 to 60 or more oxyethylene units, such as heptylphenoxypolyethoxyethanols, octylphenoxypolyethoxyethanols, methyloctylphenoxypolyethoxyethanols, nonylphenoxypolyethoxyethanols, dodecylphenoxypolyethoxyethanols, and the like; polyethoxyethanol derivatives of methylene-linked alkyl phenols; sulfur-containing agents, such as those made by condensing 6 to 60 or more moles of ethylene oxide with nonyl, dodecyl, tetradecyl, t-dodecyl, and the like; mercaptans or with alkylthiophenols having alkyl groups of 6 to 15 carbon atoms; ethylene oxide derivatives of long-chained carboxylic acids, such as lauric, myristic, palmitic, oleic, and the like, or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units; etc.; also ethylene oxide condensates of long-chain or branched-chain amines, such as dodecylamine, hexadecylamine and octadecylamine, containing 6 to 60 oxyethylene groups, block copolymers of ethylene oxide and propylene oxide comprising a hydrophobic propylene oxide section combined with one or more hydrophilic ethylene oxide sections.

In the case of emulsion polymerization especially, a redox catalyst system is extremely effective. This includes the use of an organic peroxide, such as benzoyl peroxide, acetyl peroxide, capryl peroxide, and the like, or an inorganic peroxide, such as hydrogen peroxide, ammonium persulfate, sodium persulfate, potassium persulfate, or the like. The peroxidic catalyst is effectively coupled with a reducing agent, such as a sulfite, bisulfite, metasulfite, or hydrosulfite or ammonium, sodium, potassium, or the like.

Polymerization may also be initiated by high-energy irradiation. Suitable sources of high energy-irradiation are radioactive materials and electron accelerators. Useful as radioactive materials that supply gamma rays are irradiated isotopes, such as $Co^{60}$, fission products, such as $Cs^{137}$, adjuncts to fission reactants, such as radioactive xenon, and the like. A $Co^{60}$ source is particularly effective. Useful as radioactive materials that supply beta rays are $Sr^{90}$, and the like. Valuable as electron accelerators, which supply beta rays, are the Van de Graaff generator, the resonant transformer, and the like. Dosages in the range of 10,000 to 10,000,000 rep's, preferably 500,000 to 2,000,000 rep's, are employed. A rep is equivalent to the ionization produced by the absorption of .93 ergs of energy per gram of irradiated substance. Rep stands for roentgen-equivalent-physical and is a unit of intensity and time.

The copolymerization may be carried out according to the methods described hereinbefore and it is possible to copolymerize with the N-vinyl-2-piperazinone a comonomer or comonomers all present simultaneously, or the N-vinyl-2-piperazinone may be polymerized for a selected time and then a selected monomer or monomers may be added at a later time, either incrementally or totally, separately or collectively, as desired. Also, one or more of the selected ethylenically unsaturated polymerizable monomers may be first polymerized for a certain amount of time and to a certain stage of polymerization and then the N-vinyl-2-piperazinone added as a monomer or partially polymerized and the copolymerization continued as desired. All of these modifications are within the gamut of this invention.

Preferred comonomers include methyl methacrylate, acrylonitrile, ethyl acrylate, acrylamide, styrene, diethyl fumarate and vinyl acetate.

The copolymers of the present invention are useful as thickening agents for starch-water mixtures which are to be applied to paper or cloth. They are useful as additives for gasoline in which they are effective stabilizers in preventing gum formation and also exhibit valuable anti-rust activity. The present copolymers are useful as oil additives, particularly as pour point depressants, viscosity improvers and anti-rust, anti-wear and sludge dispersant agents. Many of the present copolymers are useful in the preparation of fibers which exhibit excellent acid dye adsorption. The copolymers of the present invention may also be used in coating formulations to provide tough, transparent adhesive coatings, with good color stability at baking temperatures. Some copolymers are also effective as aggregants for soils and glossing agents for leather. The copolymers may often be extruded, molded, or cast in any desired form to provide architectural signs, ornaments and structures.

The copolymers of the present invention may be prepared in a wide range of percentages of molecular units. The valuable properties described hereinbefore are observed when as little as 0.5% by weight of the specific N-vinyl-2-piperazinones of this invention are employed. It is generally preferable to use about 2% or more of this monomer. As an upper limit, there is preferably employed about 80% of the N-vinyl-2-piperazinone monomer.

Homopolymers of the present invention vary in characteristics from viscous oils to high-melting solids depending on the structural features of the monomer and on the degree of polymerization. Lower members of the series of N-vinyl-2-piperazinones, wherein the total of $R^1$, $R^2$ and $R^3$ does not exceed 3 carbon atoms, furnish water-soluble homopolymers which are useful as corrosion inhibitors in acid pickling baths, as dye assistants, and in the treatment of paper, cloth and the like. The higher members show excellent solubility in lubricating oils, to which they impart stabilizing properties. Acid salts of the homopolymers are useful thickening agents when used in combination with polymeric latexes.

The N-vinyl-2-piperazinones of this invention also show activity in biological systems, which can be optimized by appropriate selection of the groups which are attached to the piperazinone ring. Higher members of the series, particularly in the form of their salts, show fungistatic and bacteriostatic activity, and they are also useful as adjuvants in pesticidal sprays. The compounds as a class provide rust protection when they are dissolved in gasolines and oils, and they stabilize them against harmful deposits and provide cleansing action.

The N-vinyl-2-piperazinones of the present invention, as well as the polymers thereof, may be more fully understood from the following examples which are offered by way of illustration and not by way of limitation. Parts by weight are used throughout.

Example 1

A solution is made of 193 parts of 3,3-dimethyl-2-piperazinone in 750 parts of N-methylpyrrolidone and 14.8 parts of potassium isopropoxide (10 mole percent based on the piperazinone) introduced as a 25% solution in 2-propanol. The mixture is cooled to 12° C. and is saturated at that temperature with acetylene at 250 p.s.i.g. It is then pumped at constant flow, with stirring under pressure, through a reactor held at 190° C., at such a rate that the average holding time is 10 minutes at that temperature. The crude reactor effluent is flash-distilled to remove low-boil fractions, and the residue is distilled to give 95 parts of a liquid boiling at 95° C. at 0.5 mm. Hg, which analyzes correctly for 3,3-dimethyl-1-vinyl-2-piperazinone. The product is redistilled, boiling at 79° to 80° C. at 0.11 mm. Hg, $n_D^{25}$ 1.515. It solidifies on standing. This product can be further purified by recrystallization from hexane, if desired.

In a similar manner, there are prepared 3,3-pentamethylene - 1 - vinyl - 2 - piperazinone, 4 - benzyl - 1 - vinyl-2 - piperazinone, 3,3 - dimethyl - 4 - dodecyl - 1 - vinyl - 2-piperazinone and 3-ethyl-3-methyl-1-vinyl-2-piperazinone from the corresponding piperazinone and acetylene.

Example 2

A mixture is made of 50 parts of 2-piperazinone and 120 parts of N-methylpyrrolidone. In this mixture is dissolved 3 parts of potassium metal. The mixture is charged to a pressure reactor of the Magna Dash type, the reactor is pressure checked and flushed first with nitrogen and then with acetylene. The mixture is heated at 129° to 152° C. under 400 p.s.i.g. acetylene pressure until acetylene absorption is negligible (about 100 minutes). The reactor is then cooled, vented and opened. The reaction is flash-distilled to remove low-boil fractions and the product is then distilled over a wide range of 55° to 109° C. at 0.3 mm. Hg. This fraction is redistilled carefully to yield 15 parts of a colorless liquid, boiling point 91° to 93° C. at 0.12 mm. Hg, $n_D^{25}$ 1.540. This liquid analyzes correctly for 1-vinyl-2-piperazinone.

In a similar manner, there are prepared 4-octadecyl-1-vinyl-2-piperazinone, 3-phenyl-1-vinyl-2-piperazinone, 4-[2'-(dimethylamino)isobutyl]-1-vinyl-2-piperazinone and 1-vinyl-5,6-tetramethylene-2-piperazinone from the corresponding piperazinone and acetylene.

Example 3

To 33 parts of toluene at 90° C. is added a mixture of 30 parts of methyl methacrylate, 19 parts of ethyl acrylate, 1 part of 3,3-dimethyl-1-vinyl-2-piperazinone and 0.25 part of azodiisobutyronitrile. The mixture is heated at 90° C. for 8 hours under a nitrogen blanket. A solution of 0.05 part of azodiisobutyronitrile in 14 parts of toluene is added after 2 hours of the stated heating period. Similar additions are made at the end of 4 and 6 hours. There results a clear, colorless solution of the copolymer with a Gardner-Holdt viscosity of V, taken at 25° C. Films of this polymer, made by spraying or casting, are clear, colorless, heat-stable and have unusual adhesion to surfaces.

In a similar manner, using the same ratios of azodiisobutyronitrile, introduced in the same manner, there are prepared resins consisting of copolymers of the following compositions:

(A)

30 parts of methyl methacrylate
12 parts of butyl acrylate
7 parts of styrene
2 parts of 1-vinyl-2-piperazinone (B)

30 parts of methyl methacrylate
5 parts of acrylonitrile
8 parts of hexyl acrylate
2 parts of 3,3-pentamethylene-1-vinyl-2-piperazinone, of the structure:

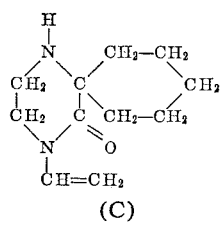

(C)

50 parts of sec-butyl methacrylate
1 part of 2-N-tert-butylaminoethyl methacrylate
1 part of 1-vinyl-2-piperazinone All of these copolymers give viscous solutions in organic solvents which, when applied to a variety of surfaces by brushing or spraying, give clear, hard adhesive films.

Example 4

A mixture is made of 10 parts of 3,3-dimethyl-1-vinyl-2-piperazinone, 10 parts of methyl methacrylate and 0.1 part of azodiisobutyronitrile. A nitrogen blanket is placed over the mixture, which is then heated at 70° C. for 15 hours. A clear yellow, hard polymer is obtained on cooling to room temperature. It is further purified by dissolving it in the minimum amount of chloroform and slowly adding this solution to a large excess of diethyl ether. The purified polymer precipitates and there is recovered, on filtration, 13.4 parts of white solid polymer. The polymer has a neutral equivalent of 481, when titrated with perchloric acid in glacial acetic acid, which corresponds to a proportion of about 3.3 parts of methyl methacrylate to 1 part of the vinylpiperazinone in the final purified polymer. The polymer is molded or cast into structural forms which have good strength properties combined with resistance to flow at elevated temperatures.

Example 5

A sample of 3,3-dimethyl-1-vinyl-2-piperazinone is carefully purified by recrystallization from hexane to a melting point of 46° C. and a neutral equivalent of 154. To 10 parts of this purified monomer is added 0.5 part of azodiisobutyronitrile. The mixture is heated in a molten state under nitrogen at 70° C. for 18 hours. There is obtained a clear yellow polymer, which is purified by dissolving it in chloroform and precipitating it from ethyl acetate. There is obtained 5.8 parts of a white solid polymer which is soluble in chloroform. A stable film is cast from the chloroform solution.

A similar solid is obtained by heating a solution of 10 parts of the above vinylpiperazinone in 25 parts of toluene with 0.04 parts of azodiisobutyronitrile at 60° C. for 17 hours under nitrogen. The very viscous solution is thinned with a little chloroform and added dropwise to 500 parts of ethyl acetate. The polymer is removed by filtration. It has a neutral equivalent of about 166 and contains about 17.6% nitrogen by analysis. It is rapidly adsorbed from water solutions onto clays and other inorganic suspensions, thereby promoting settling.

Example 6

A mixture is made of 15 parts of hexadecyl methacrylate, 5 parts of 3,3-dimethyl - 4-dodecyl - 1-vinyl - 2-piperazinonone and 0.02 part of azodiisobutyronitrile. The mixture is heated under nitrogen for 24 hours at 70° C. The viscous oil which results is useful as an additive for stabilizing heating and luricating oils.

Similar polymers are prepared in the same manner, substituting, respectively, 3,3-dimethyl - 1-vinyl - 2-piperazinone, 3 - dodecyl - 5,6-tetramethylene - 1-vinyl - 2-piperazinone and 4-octadecyl - 1-vinyl - 2-piperazinone for the 3,3-dimethyl-4-dodecyl-1-vinyl-2-piperazinone.

Example 7

A mixture is made of 5 parts of 1-vinyl - 2-piperazinone with 5 parts of acrylamide and 0.1 part of azodiisobutyronitrile. The mixture is heated at 70° C. for 18 hours under a nitrogen blanket. The hard, solid copolymer which results is soluble in water. Aqueous solutions are effective aggregants for soils, even at quite low concentrations.

Example 8

A mixture is made of 50 parts of toluene, 50 parts of vinyl laurate, 10 parts of vinyl acetate, 3 parts of 3,3-dimethyl - 1-vinyl - 2-piperazinone. It is heated to 70° C. while nitrogen is passed over the surface. To the mixture is then added 0.2 part of azodiisobutyronitrile. After 8 hours of heating, there is obtained a viscous solution of polymer, which is useful as a stabilizing lubricating oil additive.

Similarly, useful polymers are prepared using 3-ethyl-3-methyl - 1-vinyl - 2-piperazinone and 4-benzyl-1-vinyl-2-piperazinone in place of 3,3-dimethyl - 1-vinyl-2-piperazinone.

Example 9

A mixture is made of 3 parts of vinyl acetate, 1 part of diethyl fumarate, 0.1 part of 1-vinyl-2-piperazinone and 0.01 part of azodiisobutyronitrile in 20 parts of ethoxyethyl acetate. The mixture is heated for 24 hours at 80° C. The resulting solution becomes thick and when it is brushed or sprayed on surfaces, provides a transparent, tough, adhesive coating.

I claim:
1. A composition having the formula

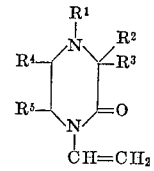

wherein
R¹ is a member from the class consisting of hydrogen, alkyl and cycloalkyl of up to 18 carbon atoms, aralkyl and alkyl-substituted aralkyl of up to 18 carbon atoms, dialkylaminoalkyl of up to 12 carbon atoms, wherein each of said alkyl groups contains up to 8 carbon atoms and furfuryl,
R², individually, is a member from the class consisting of hydrogen and methyl,
R³, individually, is a member from the class consisting of hydrogen, alkyl and cycloalkyl of up to 18 carbon atoms, phenyl, naphthyl, aralkyl and alkyl-substituted aralkyl of up to 18 carbon atoms, 2-furyl and alkyl-, chloro- and alkoxy-substituted phenyl and naphthyl in which the alkyl portion contains up to 18 carbon atoms, R⁴, individually, is a member from the class consisting of hydrogen and alkyl of up to 4 carbon atoms, R⁵, individually, is a member from the class consisting of hydrogen and alkyl of up to 3 carbon atoms, R² and R³, collectively, including the carbon atom to which they are attached, form a 5 to 7 membered saturated ring and an alkyl-substituted 5 to 7 membered saturated ring containing up to 18 carbon atoms and R⁴ and R⁵, collectively, including the carbon atom to which they are attached, form a 5 to 7 membered saturated ring and an alkyl-substituted 5 to 7 membered saturated ring containing up to 18 carbon atoms.

2. A composition according to claim 1 wherein
R¹ is hydrogen,
R² is methyl,
R³ is alkyl,
R⁴ is hydrogen and
R⁵ is hydrogen.

3. A composition according to claim 1 wherein
R¹ is alkyl,
R² is methyl,
R³ is alkyl,
R⁴ is hydrogen and
R⁵ is hydrogen.

4. A composition according to claim 1 wherein
R¹ is aralkyl,
R² is methyl,
R³ is alkyl,
R⁴ is hydrogen and
R⁵ is hydrogen.

5. A composition according to claim 1 wherein
R¹ is hydrogen,
R⁴ is hydrogen,
R⁵ is hydrogen and
R² and R³, collectively, including the carbon atom to which they are attached, represent a saturated ring of 5 to 7 carbon atoms.

6. 1-vinyl-2-piperazinone.
7. 3,3-dimethyl-1-vinyl-2-piperazinone.
8. 3,3-pentamethylene-1-vinyl-2-piperazinone.
9. 4-benzyl-1-vinyl-2-piperazinone.
10. 3-ethyl-3-methyl-1-vinyl-2-piperazinone.
11. A homopolymer of a monomer having the formula

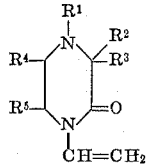

wherein
R¹ is a member from the class consisting of hydrogen, alkyl and cycloalkyl of up to 18 carbon atoms, aralkyl and alkyl-substituted aralkyl of up to 18 carbon atoms, dialkylaminoalkyl of up to 12 carbon atoms, wherein each of said alkyl groups contains up to 8 carbon atoms and furfuryl, R², individually, is a member from the class consisting of hydrogen and methyl, R³, individually, is hydrogen, an alkyl or cycloalkyl group of up to 18 carbon atoms, 2-furyl, phenyl, naphthyl, aralkyl or an alkyl-substituted aralkyl group of up to 18 carbon atoms, alkyl-, chloro- and alkoxy-substituted phenyl or naphthyl in which the alkyl portion contains up to 18 carbon atoms, or R² and R³, collectively, including the carbon atom to which they are attached, form a 5 to 7 membered saturated ring or an alkyl-substituted 5 to 7 membered saturated ring containing up to 18 carbon atoms, R⁴, individually, is hydrogen or an alkyl group of up to 4 carbon atoms, R⁵, individually, is hydrogen or an alkyl group of up to 4 carbon atoms, and R⁴ and R⁵, collectively, including the carbon atom to which they are attached, form a 5 to 7 membered saturated ring or an alkyl-substituted 5 to 7 membered saturated ring containing up to 18 carbon atoms.

12. An addition copolymer of ethylenically unsaturated monomers comprising at least one compound as defined in claim 11 and methyl methacrylate.

13. An addition copolymer of ethylenically unsaturated monomers comprising at least one compound as defined in claim 11 and acrylonitrile.

14. An addition copolymer of ethylenically unsaturated monomers comprising at least one compound as defined in claim 11 and acrylamide.

15. An addition copolymer of ethylenically unsaturated monomers comprising at least one compound as defined in claim 11 and diethyl fumarate.

16. An addition copolymer of ethylenically unsaturated monomers comprising at least one compound as defined in claim 11 and vinyl acetate.

17. An addition copolymer of ethylenically unsaturated monomers comprising at least one compound as defined in claim 11 and styrene.

18. An addition copolymer of at least one monomer as defined in claim 11 with at least one copolymerizable monomer containing at least one ethylenically unsaturated group.

19. An addition copolymer of at least one compound as defined in claim 11 with a comonomer selected from the group consisting of alkyl and aryl acrylates in which the alkyl or aryl portion contains 1 to 18 carbon atoms; alkyl and aryl methacrylates in which the alkyl or aryl portion contains 1 to 18 carbon atoms; acrylonitrile, methacrylonitrile, alkylaminoalkyl and dialkylaminoalkyl acrylates and methacrylates; acrylamide and methacrylamide and their N-alkyl-substituted derivatives; styrene and alkyl ring-substituted styrenes containing no more than a total of about 20 carbon atoms; α-methylstyrene; divinylbenzene, and alkyl-substituted divinylbenzenes; trivinylbenzene and alkyl-substituted trivinylbenzenes; vinyl esters, in which the carboxylate portion contains 1 to 18 carbon atoms, including the carbon of the carboxylate functions; vinyl alkyl ethers and vinyl alkyl sulfides in which the alkyl portion contains no more than 18 carbon atoms and N-vinyl lactams, containing from 6 to 20 carbon atoms; alkyl vinyl sulfones in which the alkyl portion contains up to about 18 carbon atoms; N-vinylalkyleneureas containing from 5 to 12 carbon atoms; isobutylene, butadiene and isoprene, dialkyl fumarates of up to 24 carbon atoms; dialkyl maleates of up to 24 carbon atoms; dialkyl itaconates of up to 24 carbon atoms; and vinylpyridines.

No references cited.

JOSEPH L. SCHOFER, *Primary Examiner.*

J. KIGHT, *Assistant Examiner.*